US011595387B2

(12) United States Patent
Paczkowski et al.

(10) Patent No.: US 11,595,387 B2
(45) Date of Patent: *Feb. 28, 2023

(54) WIRELESS NETWORK ACCESS FOR DATA APPLIANCES

(71) Applicant: T-MOBILE INNOVATIONS LLC, Overland Park, KS (US)

(72) Inventors: Lyle Walter Paczkowski, Mission Hills, KS (US); Brent Matthew Johnston, Athens, AL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/166,363

(22) Filed: Feb. 3, 2021

(65) Prior Publication Data
US 2021/0185040 A1 Jun. 17, 2021

Related U.S. Application Data

(63) Continuation of application No. 16/162,273, filed on Oct. 16, 2018, now Pat. No. 10,951,615.

(51) Int. Cl.
*H04L 9/40* (2022.01)
*H04W 12/08* (2021.01)
*G06F 16/27* (2019.01)

(52) U.S. Cl.
CPC ......... *H04L 63/0876* (2013.01); *G06F 16/27* (2019.01); *H04L 63/0823* (2013.01); *H04L 63/102* (2013.01); *H04W 12/08* (2013.01)

(58) Field of Classification Search
CPC ............ H04L 63/0876; H04L 63/0823; H04L 63/102; H04W 12/08; G06F 16/27
See application file for complete search history.

(56) References Cited

U.S. PATENT DOCUMENTS 8,769,291 B2    7/2014  Schneider et al.
9,332,018 B2 *  5/2016  Liebl, III ............... H04L 67/04
9,684,938 B2    6/2017  Seo et al.
(Continued)

FOREIGN PATENT DOCUMENTS

WO    2017220115 A1    12/2017
WO    2018109598 A1     6/2018
WO    2018162687 A1     9/2018

*Primary Examiner* — Hosuk Song

(57) ABSTRACT

A wireless access point receives data from a data appliance and transfers the data to a distributed ledger function. The distributed ledger function stores the data in a distributed ledger database, determines additional network access for the data appliance, and transfers an instruction indicating the additional network access to the wireless access point. The wireless access point receives the network access instruction, schedules the additional network access for the data appliance per the network access instruction, wirelessly transfers a network access schedule to the data appliance, wirelessly receives additional data from the data appliance per the network access schedule, and transfers the additional data to the distributed ledger function. The distributed ledger function stores the additional data in the distributed ledger database, determines future network access for the data appliance, and transfers another access instruction indicating the future network access for the data appliance to the wireless access point.

20 Claims, 8 Drawing Sheets

(56) References Cited

U.S. PATENT DOCUMENTS

| | | | | |
|---|---|---|---|---|
| 9,858,781 | B1* | 1/2018 | Campero | H04L 9/3242 |
| 9,967,261 | B2* | 5/2018 | Liebl, III | H04L 63/08 |
| 10,055,554 | B2 | 8/2018 | Papa et al. | |
| 10,135,835 | B1* | 11/2018 | Kandel | H04L 9/0637 |
| 10,440,028 | B1* | 10/2019 | Makmel | H04L 63/0861 |
| 10,475,272 | B2* | 11/2019 | Campero | G06F 9/451 |
| 10,496,989 | B2 | 12/2019 | Castinado et al. | |
| 10,623,257 | B1* | 4/2020 | Marquardt | H04W 12/069 |
| 10,715,531 | B2 | 7/2020 | Thekadath et al. | |
| 10,720,232 | B2 | 7/2020 | Giordano et al. | |
| 10,915,615 | B2* | 2/2021 | Liu | G06F 21/32 |
| 2009/0094318 | A1 | 4/2009 | Gladwin et al. | |
| 2016/0012424 | A1 | 1/2016 | Simon et al. | |
| 2016/0260169 | A1 | 9/2016 | Arnold et al. | |
| 2017/0230375 | A1 | 8/2017 | Kurian | |
| 2018/0139042 | A1 | 5/2018 | Binning et al. | |
| 2018/0197156 | A1 | 7/2018 | Beesley et al. | |
| 2018/0349845 | A1 | 12/2018 | Klein | |

* cited by examiner

WIRELESS NETWORK ACCESS FOR DATA APPLIANCES

RELATED CASES

This United States patent application is a continuation of U.S. patent application Ser. No. 16/162,273 that was filed on Oct. 16, 2018 and is entitled "WIRELESS NETWORK ACCESS FOR DATA APPLIANCES." U.S. patent application Ser. No. 16/162,273 is hereby incorporated by reference into this United States patent application.

TECHNICAL BACKGROUND

Wireless data networks serve wireless telephones with mobile data services like video streaming, internet access, and voice calling. The wireless data networks have wireless access points that exchange user data over the air with the wireless telephones. In addition to telephones, various other data machines like drones and sensors use the wireless data networks to transfer their user data to remote databases. To attach to a wireless data network, the wireless user device selects a wireless access point and performs a random access procedure with the wireless access point. The random access procedure usually results in a wireless data link between the wireless user device and the wireless access point that supports services like video streaming, internet access, and voice calling. The number of wireless user devices is rapidly increasing.

The wireless data networks have databases that control access to the wireless links by the wireless user devices. The databases authenticate the wireless user devices and then authorize services for the authenticated and qualified user devices. The databases refuse wireless links to the wireless user devices that cannot be authenticated or authorized (emergencies excepted). Exemplary databases include Authentication Server Function (AUSF), Home Subscriber System (HSS), and Authentication, Authorization, and Accounting (AAA).

The wireless data networks have data centers that are referred to as Network Function Virtualization Infrastructures (NFVIs). The NFVIs are directed by Management and Orchestration (MANO) systems. The MANO systems implement Network Service Descriptors (NSDs) to drive the NVFIs to execute Virtual Network Functions (VNFs). To deliver wireless data services, the wireless user devices communicate with the VNFs that are running in the NFVIs. Some of the VNFs comprise databases like AUSF, HSS, and AAA. Unfortunately, the load on these databases is rapidly increasing due to the massive increase in wireless user devices.

A network slice comprises a virtual portion of the wireless data network. To form a network slice, a network slice controller instructs NFV MANO systems to implement NSDs for the network slice. NFV MANO systems directs the NFVIs to run the VNFs for the network slice based on the NSDs. The network slice controller also instructs the wireless access points for the network slice to serve the wireless user devices for the network slice. To deliver wireless data services within the network slice, the wireless user devices communicate with the wireless access points in the network slice, and the access points communicate with the network slice VNFs that are running in the NFVIs.

A distributed ledger is comprised of data blocks that are copied and executed across multiple computers. Each copy of the data block has a distributed application and a distributed database. The distributed application in the ledger blocks reaches consensus on new data across all ledger computers before storing the copies of the data in the distributed database in all ledger computers. For example, the distributed application reaches a consensus on a user's monetary payment amount before storing the monetary payment amount in a user's account in the distributed database. The distributed ledgers also use ledger oracles to validate and verify information before processing by the distributed application and storage by the distributed database. Various distributed applications, ledger oracles, and consensus algorithms are available for adaption and implementation in the distributed ledgers.

Unfortunately, wireless data networks have not effectively and efficiently integrated network slicing and distributed ledgers to offload their heavily-loaded databases which authenticate and authorize the rapidly increasing number of wireless user devices.

TECHNICAL OVERVIEW

A wireless access point receives data from a data appliance and transfers the data to a distributed ledger function. The distributed ledger function stores the data in a distributed ledger database, determines additional network access for the data appliance, and transfers an instruction indicating the additional network access to the wireless access point. The wireless access point receives the network access instruction, schedules the additional network access for the data appliance per the network access instruction, wirelessly transfers a network access schedule to the data appliance, wirelessly receives additional data from the data appliance per the network access schedule, and transfers the additional data to the distributed ledger function. The distributed ledger function stores the additional data in the distributed ledger database, determines future network access for the data appliance, and transfers another access instruction indicating the future network access for the data appliance to the wireless access point.

DETAILED DESCRIPTION

Figure 1:
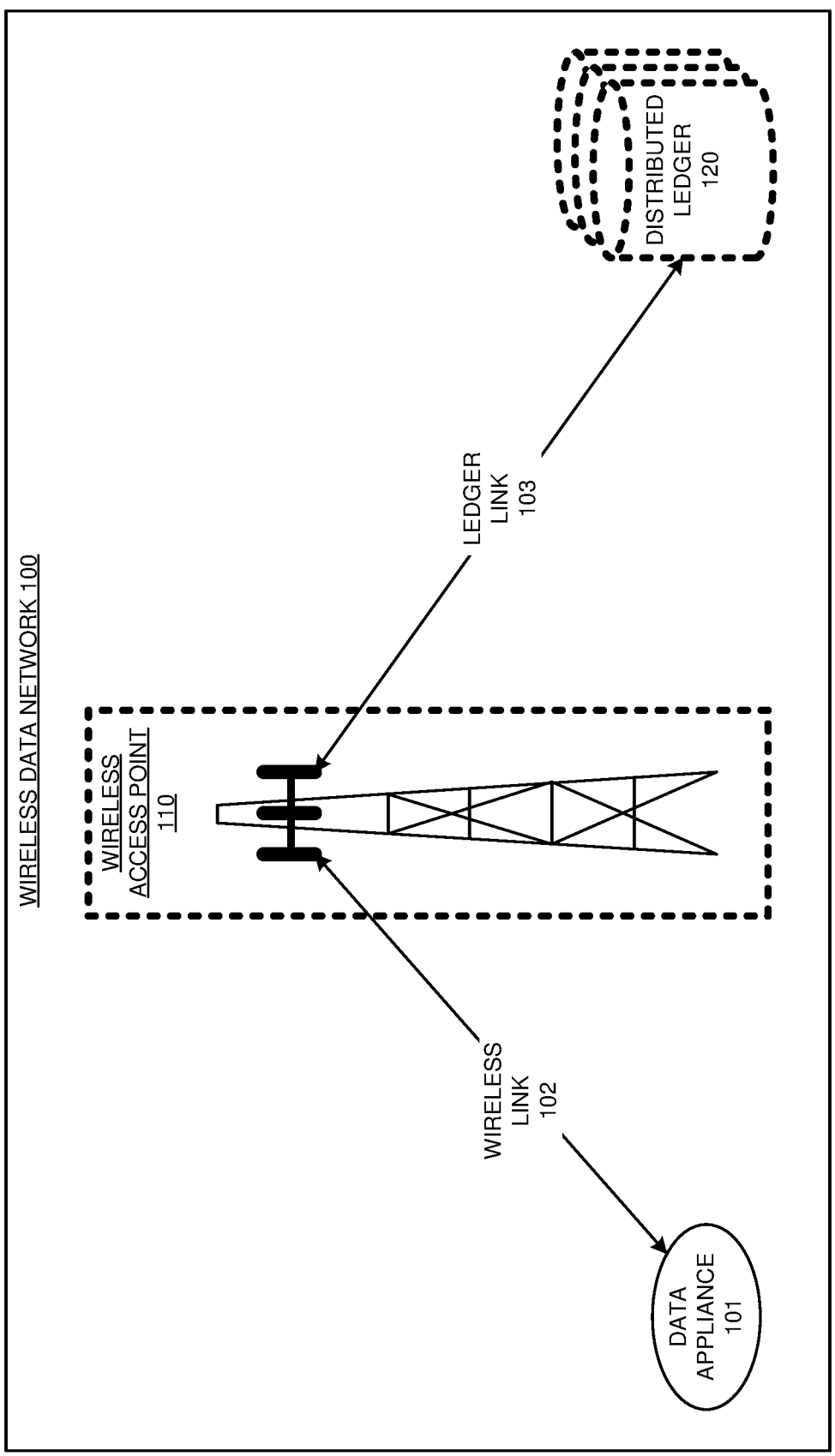
FIG. 1 illustrates a wireless data network that has a distributed ledger to control wireless network access for data appliances.

FIG. 1 illustrates wireless data network 100 that has distributed ledger 120 to control wireless network access for data appliance 101. Wireless data network 100 comprises data appliance 101, wireless link 102, wireless access point 110, ledger link 103, and distributed ledger 120. Data appliance 101 and wireless access point 110 wirelessly exchange data over wireless link 102. Wireless access point 110 and distributed ledger 120 exchange data over ledger link 103. Wireless data network 100 typically has a far greater number of data appliances, access points, links, and ledgers, but the amount shown has been restricted for clarity. In addition, ledger link 103 may comprise one or more data networks or cores.

Data appliance 101 comprises a sensor, computer, phone, vehicle, drone, headset, graphic display, or some other user apparatus with wireless communication capability. Data appliance 101 comprises a wireless transceiver and baseband circuitry. The wireless transceiver circuitry comprises antennas, modulators, amplifiers, filters, digital/analog interfaces, Digital Signal Processors (DSPs), memory circuitry, firmware/software, and bus circuitry. The wireless transceiver circuitry uses wireless network protocols like Fifth Generation New Radio (5GNR), Long Term Evolution (LTE), Institute of Electrical and Electronic Engineers 802.11 (WIFI), or some other wireless communication protocol.

In data appliance 101, the baseband circuitry comprises processing circuitry, memory circuitry, software, bus circuitry, and perhaps additional transceiver circuitry. The processing circuitry comprises Central Processing Units (CPUs), Graphics Processing Units (GPUs), Application Specific Integrated Circuits (ASICs), Field Programmable Gate Arrays (FPGAs), and/or some other electronic circuitry. The memory circuitry comprises volatile and/or non-volatile data storage like Random Access Memory (RAM), cache memory, flash drives, disk drives and the like. The software includes an operating system and modules for Physical Layer (PHY), Media Access Control (MAC), Radio Link Control (RLC), Packet Data Convergence Protocol (PDCP), Radio Resource Control (RRC), Service Data Application Protocol (SDAP), and the like. The software may also include user applications, network slice applications, hardware-trust applications, and distributed ledger applications.

Wireless access point 110 comprises wireless transceiver circuitry and baseband circuitry. The wireless transceiver circuitry comprises antennas, modulators, amplifiers, filters, digital/analog interfaces, DSPs, memory circuitry, firmware/software, and bus circuitry. The wireless transceiver circuitry uses wireless network protocols like 5GNR, LTE, and WIFI. The baseband circuitry comprises processing circuitry, memory circuitry, software, bus circuitry, and network transceiver circuitry. The processing circuitry comprises CPUs, GPUs, ASICs, and/or some other data electronics. The memory circuitry comprises volatile and non-volatile data storage like RAM, cache memory, flash drives, disk drives and the like. The software includes an operating system and modules for the PHY, MAC, RLC, PDCP, RRC, SDAP, slice control, ledger access, and the like. In some examples, wireless access point 110 comprises Network Function Virtualization (NFV) hardware that hosts software for virtualization layers, Management and Orchestration (MANO), and Virtual Network Functions (VNFs) for PHY, MAC, RLC, PDCP, RRC, and SDAP In wireless access point 110, the network transceiver circuitry comprises amplifiers, filters, digital/analog interfaces, DSPs, memory circuitry, firmware/software, and bus circuitry. The network transceiver circuitry typically uses landline network protocols like IEEE 802.3 (Ethernet), Internet Protocol (IP), Data over Cable System Interface Specification (DOCSIS), Time Division Multiplex (TDM), Wave Division Multiplex (WDM), Synchronous Optical Network (SONET), and the like. The network transceiver circuitry may use wireless network protocols like WIFI, LTE, 5GNR, or another over-the-air format.

Ledger link 103 may comprise a data tunnel between wireless access point 110 and distributed ledger 120. The data tunnel may use Ethernet, DOCSIS, TDM, WDM, SONET, IP, and the like. In addition, ledger link 103 may use wireless links like 5GNR, LTE, WIFI, and the like. Ledger link 103 may also comprise data networks that couple wireless access point 110 to distributed ledger 120. These data networks comprise network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The software includes an operating system and modules for network elements like Access and Mobility Management Functions (AMF), Authentication Server Function (AUSF), Unified Data Management (UDM), Policy Control Function (PCF), Session Management Function (SMF), Application Function (AF), Mobility Management Entity (MME), Home Subscriber System (HSS), Serving Gateway (S-GW), Packet Data Network Gateway (P-GW), Policy Charging Rules Function (PCRF), Internet Protocol Multimedia Subsystem (IMS) servers, Network Access Servers (NAS), routers, applications servers, firewalls, and/or other networking modules. Wireless access point 110 and distributed ledger 120 may communicate over the AMF, MME, UPF, SGW, and/or PGWs. The software may also include modules for network slice control and distributed ledger access. In some examples, the data networks comprise NFV hardware that hosts virtualization layers, MANO, and VNFs for the AMF, AUSF, UDM, PCF, SMF, AF, MME, HSS, S-GW, P-GW, PCRF, IMS servers, NAS, routers, and/or some other network elements.

Distributed ledger 120 comprises multiple computer systems and ledger software. The computer systems exchange consensus data over various landline and/or wireless communication networks. The computer systems comprise processing circuitry, memory circuitry, software, bus circuitry, and transceiver circuitry. The processing circuitry comprises CPUs, GPUs, ASICs, and/or the like. The memory circuitry comprises volatile and non-volatile data storage like RAM, cache memory, flash drives, disk drives and the like. The software is stored in the memory circuitry and is executed by the processing circuitry. The software comprises operating systems, network interfaces, ledger oracles, distributed applications, and distributed databases. The transceiver circuitry comprises computer I/O ports, memory, DSPs, and may comprise radio circuitry for wireless communications. In some examples, distributed ledger 120 comprises NFV hardware that hosts virtualization layers, MANO, and VNFs for the interfaces, oracles, applications, and databases.

A network slice comprises a portion of wireless data network 100 that serves a particular purpose and/or user group. Network slices typically share wireless data network hardware and virtual layer software although these resources could be dedicated to the slice in some examples. A network slice typically has its own VNFs although some VNFs may be shared among slices. To establish a network slice, a slice controller directs a MANO system to control the NFV virtual layer to drive the NFV hardware to execute the VNFs for the slice. A network slice may include: data appliance 101, link 102, link 103, wireless access point 120, and/or distributed ledger 120. The slice controller configures the network elements that form the network slice.

For wireless data network 100, the slice controller directs the creation, operation, and termination of the slice based on a slice configuration. The slice configuration indicates a Network Service Descriptor (NSD) that details the VNFs, Virtual Links (VLs), Physical Network Functions (PNFs), PNF Forwarding Graphs (PNFFGs), and VNF Forwarding Graphs (VNFFGs) for the slice. The slice configuration may indicate data appliances, wireless access points, network cores, distributed ledgers, and other network elements in the network slice. The access points, cores, and ledgers may comprise VNFs in the NSD. Network slices may be coupled together. For example, a first network slice formed by data appliance 101 and wireless access point 110 could be coupled to a second network slice formed by ledger link 103 and distributed ledger 120.

In wireless data network 100, data appliance 101 wirelessly transmits a network access request to wireless access point 110 over wireless link 102. The network access request has an indicator for distributed ledger 120 and an identifier for data appliance 101. Wireless access point 100 wirelessly receives the network access request over wireless link 102. In response to the indicator for distributed ledger 120 in the network access request, wireless access point 100 transfers the identity for data appliance 101 to distributed ledger 120 over ledger link 103. In some examples, the appliance identity traverses a data tunnel to reach distributed ledger 120 without traversing or loading the AMF, AUSF, MME, or HSS. In other examples, the appliance identity traverses network elements like an AMF or MME to reach distributed ledger 120 without traversing or loading the AUSF or HSS.

Advantageously, the network access request from data appliance 101 may only need a name to communicate with distributed ledger 120. In wireless access point, the RRC could enter a data structure with the name provided by data appliance 101 to yield contact information for distributed ledger 120. In response, the RRC uses the contact information to transfer the identity for data appliance 101 to distributed ledger 120 over ledger link 103. A network slice controller may configure the RRC data structure to control network slices in support.

Distributed ledger 120 receives the appliance identity over ledger link 103. Distributed ledger 120 may receive the appliance identity directly over a data tunnel or indirectly through network elements like an AMF or MME. Distributed ledger 120 reaches consensus on the appliance identity by using a consensus algorithm across multiple ledger computers. In some examples, a ledger oracle or distributed application verifies hardware-trust of data appliance 101. In these examples, the data appliance identity may comprise an encrypted hardware-trust identifier that is physically embedded in a read-only memory in data appliance 101. Alternatively, the data appliance identity may comprise a hardware-trust digital certificate that was digitally signed by a hardware-trust authority that has already validated hardware-trust of data appliance 101. The ledger oracle or distributed application in distributed ledger 120 verifies hardware-trust of data appliance 101 by decrypting and verifying the encrypted hardware-trust identifier or the encrypted hardware-trust digital certificate. A network slice controller may configure the ledger oracle or the distributed application to control network slices in support.

Distributed ledger 120 determines network access for data appliance 101 per the appliance identity. In some examples, a ledger oracle or distributed application translates the appliance identity into a network access instruction for data appliance 101. The network access instruction may indicate access codes, oracle addresses, radio frequencies, transmit/receive times, data amounts, quality-of-service, wireless access point identifiers, network identifiers, network slice identifiers, and the like. A network slice controller may configure the ledger oracle or the distributed application to control network slices in support. Distributed ledger 120 reaches consensus on the network access instruction by using the consensus algorithm across the ledger computer systems. When consensus is reached, distributed ledger 120 transfers the network access instruction to wireless access point 110 over ledger link 103. The network access instruction may traverse a data tunnel and/or network elements to reach wireless access point 110.

Wireless access point 110 receives the network access instruction over ledger link 103. Wireless access point 110 schedules wireless network access for data appliance 101 per the network access instruction. For example, the MAC in wireless access point may assign uplink and downlink resource blocks to data appliance 101. Wireless access point 110 wirelessly transfers a network access schedule to data appliance 101. Data appliance 101 wirelessly transfers user data to wireless access point 110 over wireless link 102 per the network access schedule. Wireless access point 110 wirelessly receives the user data from data appliance 101 per the network access schedule. Wireless access point 110 transfers the user data to the distributed ledger over ledger link 103. The user data may traverse data tunnels and/or network elements to reach distributed ledger 120.

Distributed ledger 120 receives the user data over ledger link 103. A ledger oracle typically validates and formats the user data. Distributed ledger 120 reaches consensus on the user data with the consensus algorithm across the ledger computers. Distributed ledger 120 stores the user data in a distributed database. In some examples, distributed ledger 120 determines additional network access for data appliance 101 per the appliance identity and the user data. A network slice controller may configure the ledger oracle or the distributed application to support the operation. In these examples, distributed ledger 120 reaches consensus on a new network access instruction for data appliance 101 and transfers the new network access instruction to wireless access point 110 over ledger link 103. Wireless access point 110 schedules additional wireless network access for data appliance 101 per the new network access instruction and transfers the network access schedule to data appliance 101. Wireless access point 110 wirelessly receives additional user data from data appliance 101 per the network access schedule and transfers the additional user data to distributed ledger 120 over ledger link 103.

Figure 2:
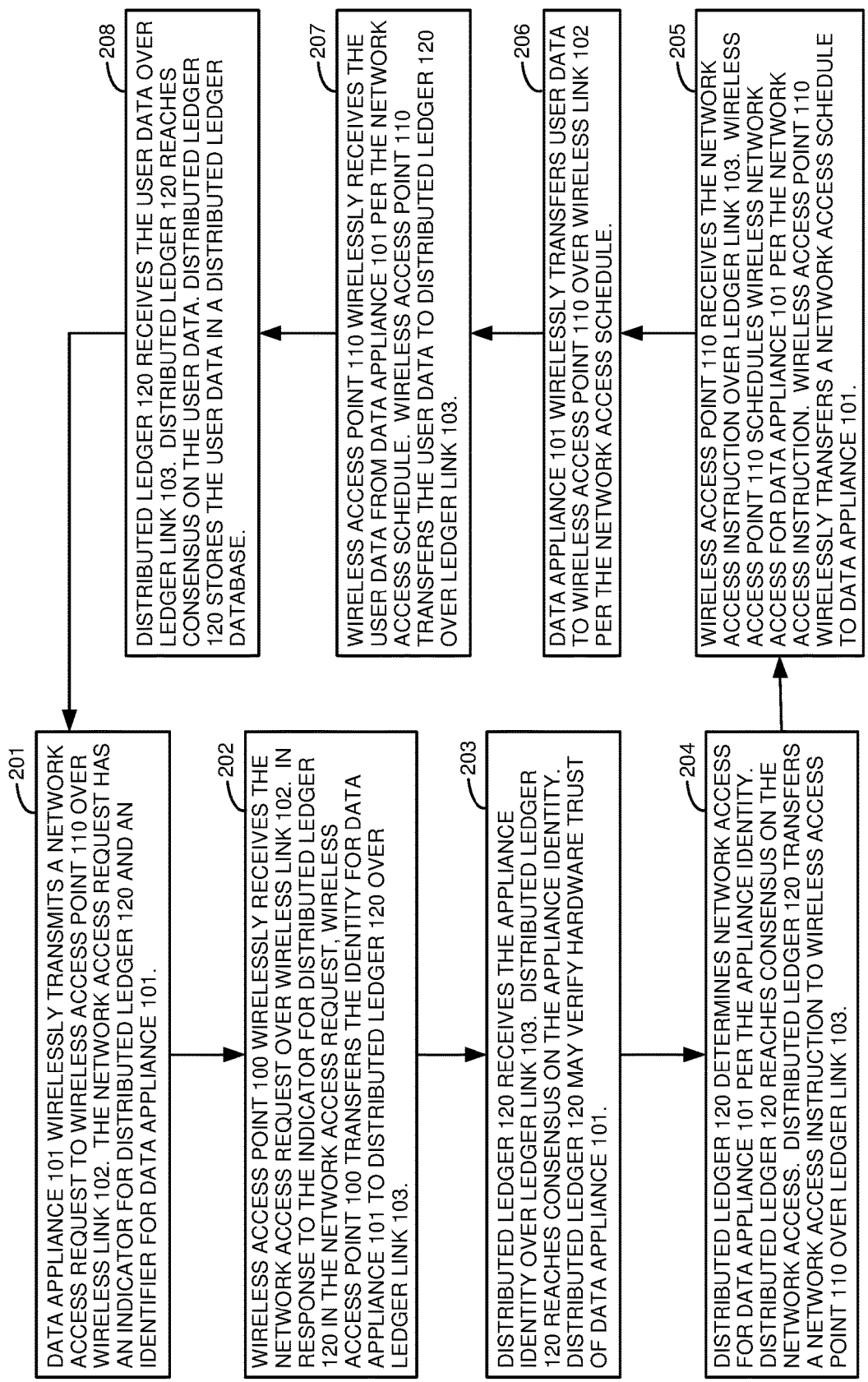
FIG. 2 illustrates the operation of the wireless data network having the distributed ledger to control wireless network access for the data appliances.

FIG. 2 illustrates the operation of wireless data network 100 having distributed ledger 120 to control wireless network access for data appliance 101. Data appliance 101 wirelessly transmits a network access request to wireless access point 110 over wireless link 102 (201). The network access request has an indicator for distributed ledger 120 and an identifier for data appliance 101. Wireless access point 100 wirelessly receives the network access request over wireless link 102 (202). In response to the indicator for distributed ledger 120 in the network access request, wireless access point 100 transfers the identity for data appliance 101 to distributed ledger 120 over ledger link 103. In some examples, the network access request from data appliance 101 has the name of an oracle or ledger, and wireless access point 110 translates this name into contact information for distributed ledger 120. In some examples, an AMF or MME translates the name into the contact information for distributed ledger 120. The AMF may receive N2 signaling from wireless access point 110 having the name and responsively transfer the identifier for data appliance 101 to distributed ledger 120 over ledger link 103. The MME may receive S1-MME signaling from wireless access point 110 having the name and responsively transfer the identifier for data appliance 101 to distributed ledger 120 over ledger link 103.

Distributed ledger 120 receives the appliance identity over ledger link 103 (203). Distributed ledger 120 reaches consensus on the appliance identity by using a consensus algorithm across multiple ledger computers. Various consensus algorithms are available for adaption and use to achieve ledger consensus. In some examples, an oracle or distributed application verifies hardware trust of a physically-embedded hardware-trust identifier or a hardware-trust digital certificate. Distributed ledger 120 determines network access for data appliance 101 per the appliance identity (204). A ledger oracle or distributed application in distributed ledger 102 may host a data structure that translates the identity for data appliance 101 into the network access instruction for data appliance 101. The data structure may be configured by a slice controller. Distributed ledger 120 reaches consensus on the network access instruction with the consensus algorithm across the ledger computers. Distributed ledger 120 transfers the network access instruction to wireless access point 110 over ledger link 103 (204). In some examples, an AMF or MME receives the network access instruction over ledger link 103 and transfers the network access instruction to wireless access point 110 in respective N2 or S1-MME signaling. In these examples, the AMF or MME may transfer respective N3 or S5 signaling to respective UPFs or SGWs based on the network access instruction to implement a user data path for ledger link 103 between wireless access point 110 and distributed ledger 120.

Wireless access point 110 receives the network access instruction over ledger link 103 (205). The network access instruction may specify network addresses, transfer times, radio frequencies, transfer amounts, session qualities, and the like. Wireless access point 110 schedules wireless network access for data appliance 101 per the network access instruction. For example, wireless access point 110 may assign wireless resource blocks to data appliance 101 to meet time, frequency, amount, and quality parameters in the network access instruction. Wireless access point 110 wirelessly transfers the network access schedule to data appliance 101. Data appliance 101 wirelessly transfers user data to wireless access point 110 over wireless link 102 per the network access schedule (206). Wireless access point 110 wirelessly receives the user data from data appliance 101 per the network access schedule (207).

Wireless access point 110 transfers the user data to distributed ledger 120 over ledger link 103. The user data may traverse a data tunnel, UPF, PGW, or some other network elements. Distributed ledger 120 receives the user data over ledger link 103 (208). Distributed ledger 120 reaches consensus on the user data and stores the user data in a distributed ledger database. Typically, distributed ledger 120 processes the user data with a distributed application to generate data outputs. Distributed ledger 120 reaches consensus on the data outputs before external transfer and internal database storage. The process may repeat back to block 201 or distributed ledger 120 may determine additional network access for data appliance 101 per the appliance identity and the user data.

Distributed ledger 120 may then reach consensus on additional network access and transfer another network access instruction to wireless access point 101. Wireless access point 110 schedules additional network access for data appliance 101 and wirelessly transfers the network access schedule to data appliance 101. Wireless access point 110 receives additional user data from data appliance 101 and transfers the additional user data to distributed ledger 120.

Figure 3:
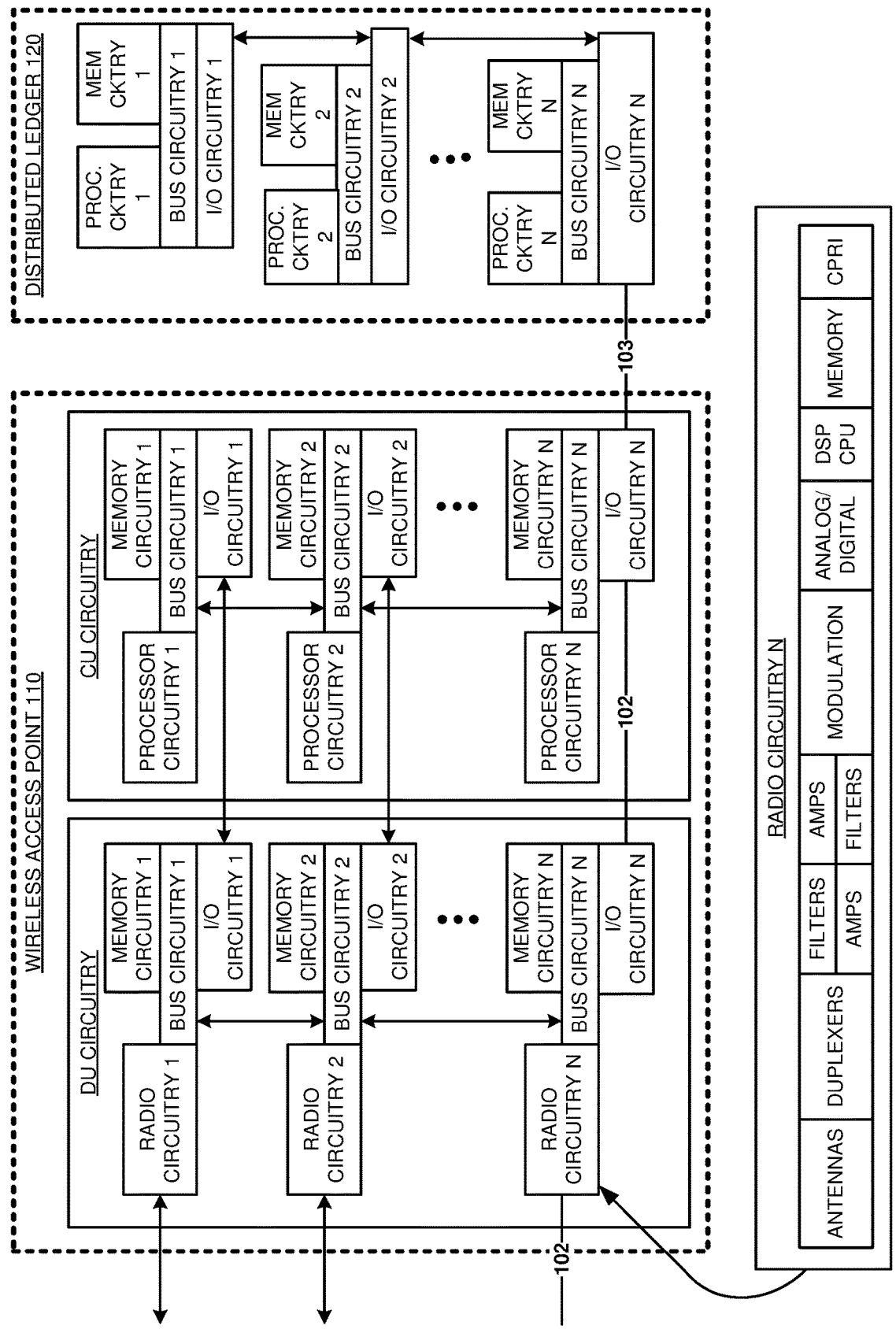
FIG. 3 illustrates a hardware architecture for the wireless access point and the distributed ledger to control wireless network access for the data appliances.

FIG. 3 illustrates a hardware architecture for wireless access point 110 and distributed ledger 120 to control wireless network access for data appliance 101. The hardware architecture is exemplary and other hardware architectures could be used. Wireless access point 110 comprises Distributed Unit (DU) circuitry and Central Unit (CU) circuitry. The DU circuitry comprises radio circuitry 1-N, memory circuitry 1-N, I/O circuitry 1-N, and bus circuitry 1-N. Bus circuitry 1-N is coupled together. Bus circuitry 1 couples radio circuitry 1, memory circuitry 1, and I/O circuitry 1. Bus circuitry 2-N, radio circuitry 2-N, memory circuitry 2-N, and I/O circuitry 2-N may be coupled in a similar manner. I/O circuitry 1 in the DU circuitry is linked to I/O circuitry 1 in the CU circuitry, and I/O circuitry 2-N are linked in a similar manner. Radio circuitry 1-N each comprise antennas, duplexers, filters, amplifiers, modulators, analog/digital interfaces, DSPs/CPUs, memory, and typically a radio interface like Common Public Radio Interface (CPRI).

The CU circuitry comprises processing circuitry 1-N, memory circuitry 1-N, I/O circuitry 1-N, and bus circuitry 1-N. Bus circuitry 1-N is coupled together. Bus circuitry 1 also couples radio circuitry 1, memory circuitry 1, and I/O circuitry 1. Bus circuitry 2-N, processing circuitry 2-N, memory circuitry 2-N, and I/O circuitry 2-N may be coupled together in a similar manner. I/O circuitry N in the CU circuitry is linked to I/O circuitry N in the DU circuitry and to I/O circuitry N in ledger 120—possibly over network element hardware in ledger link 103.

Distributed ledger 120 comprises processing circuitry 1-N, memory circuitry 1-N, I/O circuitry 1-N, and bus circuitry 1-N. Typically, the hardware of distributed ledger 120 is physically distributed, and circuitry 1 would be at a different location than circuitry 2, and circuitry N would be at a different location than circuitry 1-2. I/O circuitry 1-N couples these different packs of ledger circuitry 1-N over various data networks. Bus circuitry 1 couples radio circuitry 1, memory circuitry 1, and I/O circuitry 1. Bus circuitry 2-N, processing circuitry 2-N, memory circuitry 2-N, and I/O circuitry 2-N may be respectively coupled in a similar manner. Memory circuitry 1-N stores operating systems, oracle applications, and distributed ledger applications. Processing circuitry 1-N executes the operating systems, oracle applications, and distributed ledger applications. In some examples, these operating systems and applications comprise NFV virtual layers and VNFs for the ledger oracles and distributed ledgers.

In radio circuitry N of the DU circuitry in wireless access point 110, the antennas receive Uplink (UL) signals from data appliance 101 over wireless link 102 and transfer corresponding electrical UL signals through the duplexers to the amplifiers. The amplifiers boost the UL signals for the filters which attenuate unwanted energy. In modulation, demodulators down-convert the UL signals from their carrier frequencies. The analog/digital interfaces convert the analog UL signals into digital UL signals for the DSPs. The DSPs recover UL user data and signaling from the UL signals and transfer the recovered UL data and signaling to memory circuitry N in the DU circuitry. The UL signaling includes the network access requests and the UL data includes the user data from data appliance 101 for distributed ledger 120. The CPUs execute their OS and network apps to process the UL data and signaling. The network apps drive the DU circuitry to transfer UL data and signaling from memory circuitry N over I/O circuitry N to CU circuitry over link 102.

In the CU circuitry, the processing circuitry N executes its OS and apps/VNFs to process the UL data and signaling. The UL signaling includes the network access requests and the UL data includes the user data from data appliance 101. The apps/VNFs drive the CU circuitry to transfer UL data and signaling from memory circuitry N over I/O circuitry N and over ledger link 103 to distributed ledger 120—possibly over additional network element hardware in ledger link 103.

On the Downlink (DL) in the CU circuitry, I/O circuitry N receives DL signaling from distributed ledger 120 over ledger link 130 and possibly over network element hardware in ledger link 103. The signaling comprises network access instructions for data appliance 101 and other perhaps other ledger data outputs. I/O circuitry N stores the signaling in memory circuitry 1-N. CU processing circuitry N executes its OS and apps/VNFs to process the DL signaling. The apps/VNFs drive the CU circuitry to transfer DL signaling from memory circuitry N over I/O circuitry N and link 102 to I/O circuitry N and memory circuitry N in the DU circuitry. In the DU circuitry, radio circuitry N executes its OS and network applications to process the DL signaling. The network applications drive the DU circuitry to transfer DL signaling from memory circuitry N over its radio circuitry N and wireless link 102 to data appliance 101.

To perform this transfer from radio circuitry 1-N, the DSPs retrieve the DL signaling which includes the network access instructions for data appliance 101 and transfers corresponding DL signals to the analog/digital interface. The analog/digital interface converts the digital DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals having the network access instructions to data appliance 101 over wireless link 102.

In distributed ledger 120, I/O circuitry N exchanges the UL/DL user data and signaling with the CU circuitry over ledger link 130 and possibly through additional network core hardware. I/O circuitry N exchanges the UL/DL user data and signaling with memory circuitry N. Processing circuitry N executes its OS and apps/VNFs to process the UL/DL data and signaling. Processing circuitry 1-N executes their OS and apps/VNFs to store portions of the UL/DL data and signaling in distributed databases in memory circuitry 1-N. In particular, the ledger apps/VNFs drive processing circuitry 1-N to reach consensus on appliance identity, network access instructions, user data, and data outputs. To reach the consensus, processing circuitry 1-N exchange consensus data over I/O circuitry 1-N and various data networks. The ledger apps/VNFs may also verify hardware-trust of data appliance 101.

Figure 4:
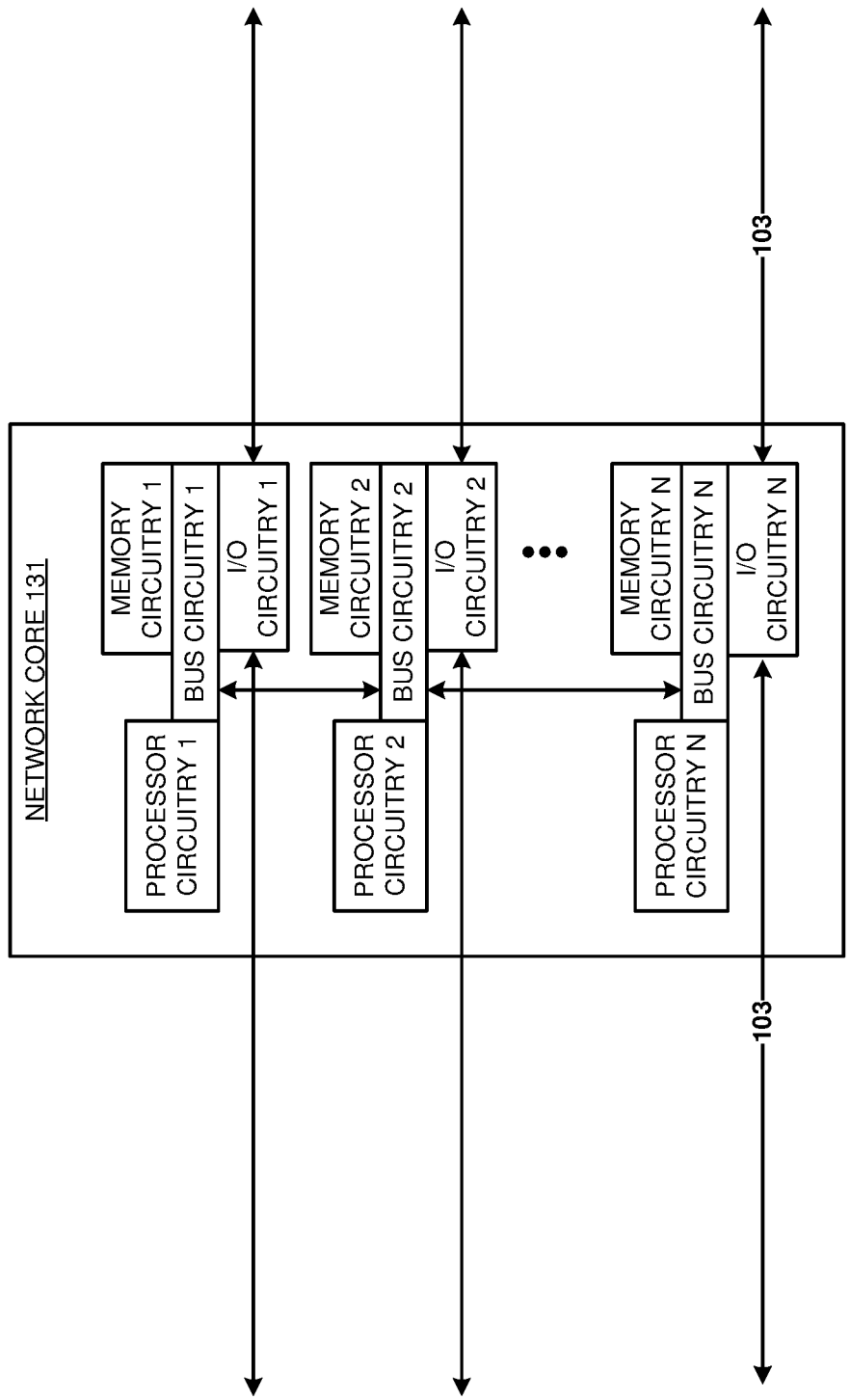
FIG. 4 illustrates a hardware architecture for a network core that couples the wireless access point and the distributed ledger to control wireless network access for the data appliances.

FIG. 4 illustrates a hardware architecture for network core 131 that couples wireless access point 110 and distributed ledger 120 to control wireless network access for data appliance 101. The hardware architecture is exemplary and other hardware architectures could be used. Network core 131 comprises processing circuitry 1-N, memory circuitry 1-N, I/O circuitry 1-N, and bus circuitry 1-N. Bus circuitry 1-N is coupled together. Bus circuitry 1 couples processing circuitry 1, memory circuitry 1, and I/O circuitry 1. Bus circuitry 2-N, processing circuitry 2-N, memory circuitry 2-N, and I/O circuitry 2-N may be respectively coupled together in a similar manner. I/O circuitry N in network core 131 forms a portion of ledger link 103 that couples wireless access point 110 to distributed ledger 102. In network core 131, memory circuitry 1-N stores NFV virtual layers, VNFs, slice controllers, MANO systems, distributed ledger applications, distributed ledger databases, and the like. Processing circuitry 1-N executes the NFV virtual layers, VNFs, slice controllers, MANO systems, distributed ledger applications, and the databases to exchange data and signaling between wireless access point 110 and distributed ledger 120. Some of the data and signaling comprises network access requests, network access instructions, user data, and data outputs associated with distributed ledger 120.

Figure 5:
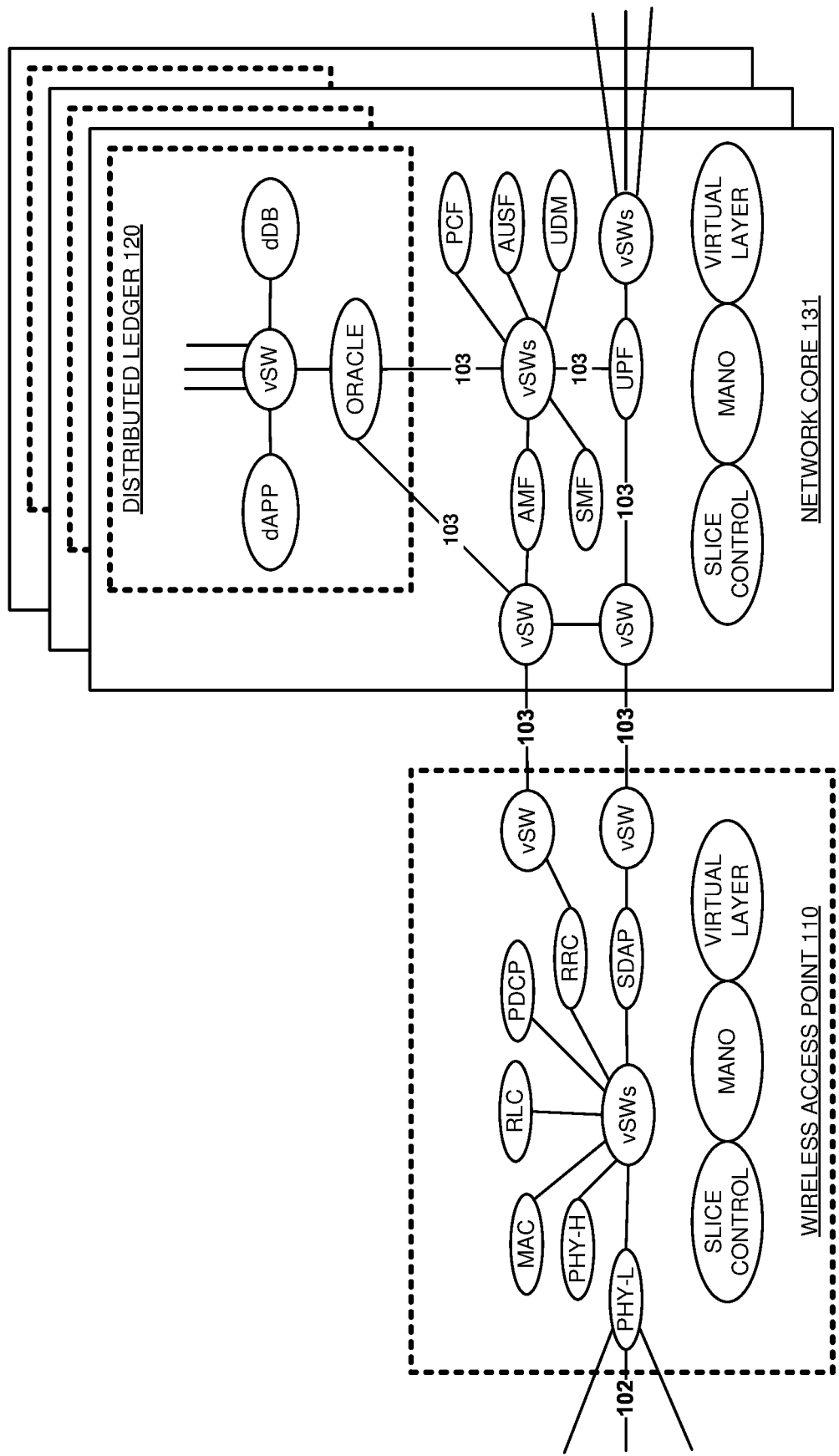
FIG. 5 illustrates a software architecture for the wireless access point, the network core, and the distributed ledger to control wireless network access for the data appliances.

FIG. 5 illustrates a software architecture for wireless access point 110, network core 131, and distributed ledger 120 to control wireless network access for data appliance 101. The software architecture is exemplary and other software architectures could be used. Wireless access point 110 may use 5GNR, LTE, WIFI, or some other wireless communication protocol. In this illustrative example, wireless access point 110 comprises network applications and VNFs. The network applications comprise PHY-LOW (PHY-L), NFV virtual layer, NFV MANO, and slice controller. The NFV virtual layer comprises operating systems, hypervisors, hardware drivers, virtual machines, vSWs, and perhaps other virtualization modules. The vSWs are shown externally to the virtual layer for clarity. The VNFs comprise PHY-HIGH (PHY-H), MAC, RLC, PDCP, RRC, SDAP, and the like. One or more vSWs couple these VNFs. The vSWs also couple the RRC and SDAP VNFs to network core 131 over ledger link 103. In wireless access point 110, the DU circuitry hosts the PHY-L and either the DU circuitry or the CU circuitry hosts the PHY-H, MAC, RLC, PDCP, RRC, and SDAP depending on the DU/CU split option.

Network core 131 may comprise a 5G core, LTE core, or some other wireless networking center. In this illustrative example, network core 131 comprises network applications and VNFs. The network applications comprise NFV virtual layer, NFV MANO, and slice controller. The NFV virtual layer comprises operating systems, hypervisors, hardware drivers, virtual machines, vSWs, and perhaps other virtualization modules. The vSWs that are shown externally to the virtual layer for clarity. The vSWs in network core 131 couple AMF and UPF VNFs to the respective RRC and SDAP VNFs in wireless access point 110 over ledger link 103. In network core 131, the vSWs couple the UPF VNFs to external systems. The vSWs couple VNFs together like AMF, SMF, UPF, PCF, AUSF, and UDM. The vSWs couple the ledger oracle VNFs to the AMF, UPF, and/or RRC VNFs over leger link 103. The vSWs couple the ledger oracle VNFs to Distributed Application (dAPP) VNFs, and the vSWs couple the dAPP VNFs to Distributed Database (dDB) VNFs. The vSWs also couple the oracle VNFs and the dAPP VNFs to the oracle and dAPP VNFs in distributed ledger 120 that are hosted by other ledger computers. In this example, distributed ledger 120 is hosted by network core 131 and other network cores. Alternatively, distributed ledger 120 may be partially hosted by the network cores or be completely external to the network cores.

In wireless access point 110, the PHY-L network applications wirelessly exchange network signaling and user data with data appliance 101 over wireless link 102. The PHY-L applications perform lower PHY functions like packet formation/deformation, windowing/de-windowing, guard-insertion/guard-deletion, and Fast Fourier Transforms (FFTs)/Inverse FFTs (IFFTs), data mapping/de-mapping, interleaving/de-interleaving, parsing/de-parsing, Forward Error Correction (FEC) encoding/decoding, control insertion/removal, Resource Element (RE) mapping/de-mapping, precoding, layer mapping/de-mapping, modulation mapping/de-mapping, channel estimation, channel equalization, and Inverse Discrete Fourier Transforms (IDFT). The PHY-L applications exchange network signaling and user data with the PHY-H VNFs. The PHY-H VNFs perform tasks like scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping.

The MAC VNFs process user data to map between the MAC transport channels and MAC logical channels. The MAC VNFs determine buffer status, power headroom, channel quality, Hybrid Automatic Repeat Request (HARQ) acknowledgements, user device identifiers, and the like. To perform HARQ on the UL, the MAC VNFs transfer ACKs for UL data and signaling. To perform power control, the MAC VNFs process channel quality and power headroom to adjust user power to overcome poor channel quality within headroom and interference limits. To perform random access, the MAC VNFs process access signaling to identify user devices and initiate scheduling. Thus, the MAC VNFs identify appliance identifiers and possibly ledger indicators. To perform scheduling, the MAC VNFs process radio channel quality, buffer status, and radio interference to assign data and signaling to wireless payloads. The MAC VNFs signal the schedule to the user devices. Thus, the MAC VNFs schedule data and signaling for data appliance 101 per the network access instructions from distributed ledger 120. The MAC VNFs process performance data like data-rate, delay, error-rate, and jitter to maintain Quality-of-Service (QoS) for the user devices. Thus, the MAC VNFs maintain QoS for data appliance 101 per the network access instructions.

The RLC VNFs map between the MAC logical channels and Protocol Data Units (PDUs). The RLC VNFs perform ARQ for the UL data and signaling by transferring UL ACKs. The RLC VNFs perform ARQ for the DL by retransmitting DL data and signaling that was not properly received. The RLC VNFs add sequence numbers on the DL and perform resequencing on the UL. The RLC VNFs perform segmentation and resegmentation. The RLC VFs exchange data and signaling with the PDCP VNFs. The PDCP VNFs map between the PDUs from the RLC and Service Data Units (SDUs) for the RRC/SDAP VNFs. The PDCP VNFs handle security by applying ciphering. The PDCP VNFs perform header compression and decompression. The PDCP VNFs add sequence numbers and re-orders received SDUs in their proper sequence. The PDCP VNFs eliminate duplicate UL data. The RRC VNFs exchanges SDUs that carry signaling and with the PDCP VNFs.

The RRC VNFs interact with the AMF VNFs to establish and terminate data sessions. Thus, the RRC VNFs signal distributed ledger 120 for network access instructions for data appliance 101 based on the data appliance identifier and the distributed ledger indicator—possibly through AMF and/or MME VNFs. The RRC VNFs transfer the network access instructions for data appliance 101 to the MAC VNFs for scheduling, QoS, and the like. The RRC VNFs support messaging between AMFs or MMEs and data appliance 101. The RRC VNFs direct the broadcast of system information to data appliance 101. The RRC VNFs may transfer paging to data appliance 101. The RRC VNFs handle security and key management. Thus, the RRC VNFs may decrypt encrypted appliance identifiers and/or ledger indicators. The RRC VNFs handle handover operations. The RRC VNFs manage reporting and QoS. The SDAP VNFs exchange SDUs that carry user data with the PDCP VNFs. The SDAP VNFs exchange user data with the UPF VNFs over vSWs. The UPF VNFs exchange the data with other systems under the control of the SMF. The SDAP VNFs map between the SDUs and QoS flows. The SDAP VNFs mark the QoS flows with the proper QoS.

In network core 131, the AMF VNFs exchange signaling with the RRC VNFs over the vSWs. The UPF VNFs exchange data with the SDAP VNFs over the vSWs. The UPF VNFs exchange data with external systems over the vSWs. The SMF VNFs control UPF VNF sessions. The AMF and SMF VNFs access the PCF, AUSF, and UDM VNFs for policy, authorization, and content. The UPF VNFs may exchange user data with distributed ledger 120. Thus, the UPF VNFs may form part of ledger link 103 by exchanging user data (and possibly signaling) between wireless access point 110 and distributed ledger 120. In a like manner, AMF VNFs may form part of ledger link 103 by exchanging signaling (and possibly user data) between wireless access point 110 and distributed ledger 120. In some examples and in response to the network access instructions from distributed ledger 120, the AMF VNFs set-up data paths over the PHY, MAC, RLC, PDCP, SDAP, UPF, and vSWs for the transfer of user data from data appliance 101 to the oracle VNFs in distributed ledger 120.

In distributed ledger 120 in network core 131, the oracle VNFs receive access requests and user data from data appliance 101 over the vSWs, VNFs, and applications in wireless access point 110 and network core 131. The oracle VNFs authorize and transfer the network access requests and user data to the dAPP VNFs. In some examples, the oracle VNFs verify hardware-trust for data appliance 101. The dAPP VNFs process the access requests and user data to generate data outputs that include network access instructions. In stages, the ledger dAPP VNFs reach consensus on these access requests, access instructions, user data, and other data outputs with the other ledger dAPP VNFs in the other network cores. The ledger dAPP VNFs store the user data and the data outputs in the dDB VNFs and transfer the data outputs. The data outputs include the network access instructions for data appliance 101.

Figure 6:
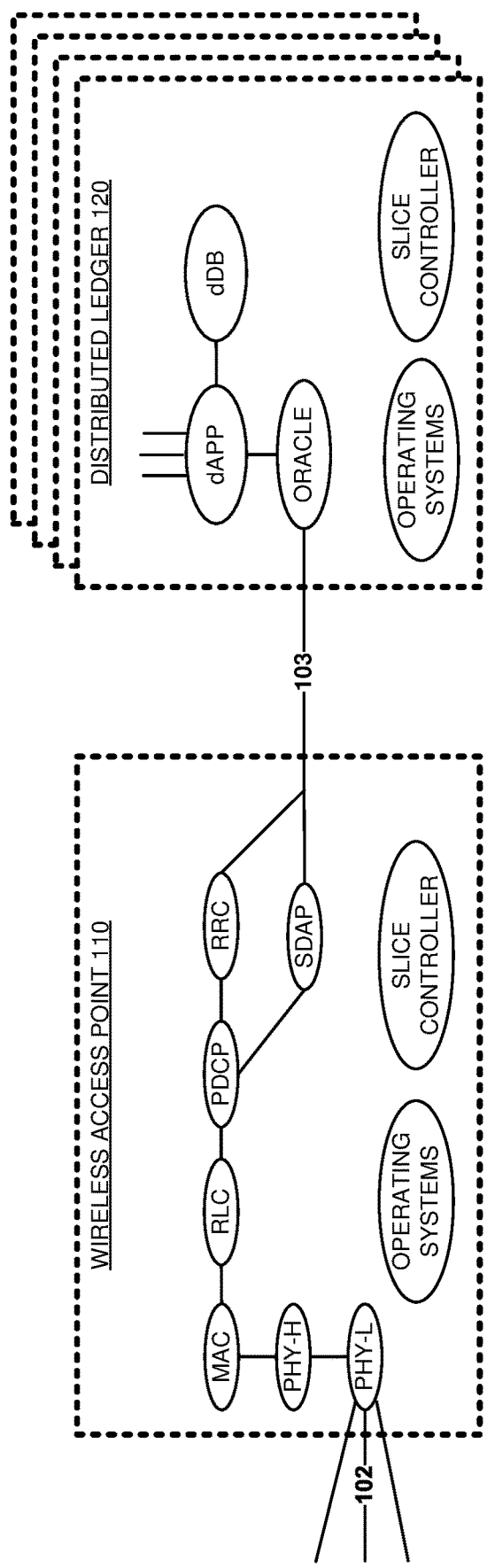
FIG. 6 illustrates another software architecture for the wireless access point and the distributed ledger to control wireless network access for the data appliances.

FIG. 6 illustrates another software architecture for wireless access point 110 and distributed ledger 120 to control wireless network access for data appliance 101. In this example, ledger link 103 comprises a data tunnel that may be direct or traverse various data networks and systems. The data tunnel may include wireless portions and could be the same or similar to wireless link 102. Wireless access point 110 may use 5GNR, LTE, WIFI, or some other wireless communication protocol. In this illustrative example, wireless access point 110 and distributed ledger 120 comprise operating systems and network applications and do not comprise NFV VNFs. The network applications comprise slice control, PHY-L, PHY-H, MAC, RLC, PDCP, RRC, SDAP, and the like. The RRC and SDAP applications are coupled to the ledger oracle application over ledger link 103.

The MAC applications process access signaling to identify the appliance identifier and the ledger indicator. The MAC applications schedule data and signaling for data appliance 101 per the network access instructions from distributed ledger 120. The MAC applications maintain QoS for data appliance 101 per the network access instruction. The RRC applications signal distributed ledger 120 with the appliance identifier to obtain network access instructions for data appliance 101. The RRC applications transfer the network access instructions for data appliance 101 to the MAC applications for scheduling, QoS, and the like. The RRC applications may decrypt appliance identifiers and/or ledger indicators and handle hardware trust operations.

In distributed ledger 120, the oracle applications receive the access requests and user data from data appliance 101 over wireless access point 110. The oracle applications authorize and transfer the network access requests and user data to the dAPP applications. The oracle applications may handle hardware-trust operations. The dAPP applications process the access requests and user data to generate data outputs that include the network access instructions. In stages, the ledger dAPP applications reach consensus on across the ledger computers for the access requests, access instructions, user data, and other data outputs. The ledger dAPP applications store the user data and data outputs in the dDB applications. The ledger dAPP applications transfer the data outputs to wireless access point 110.

Figure 7:
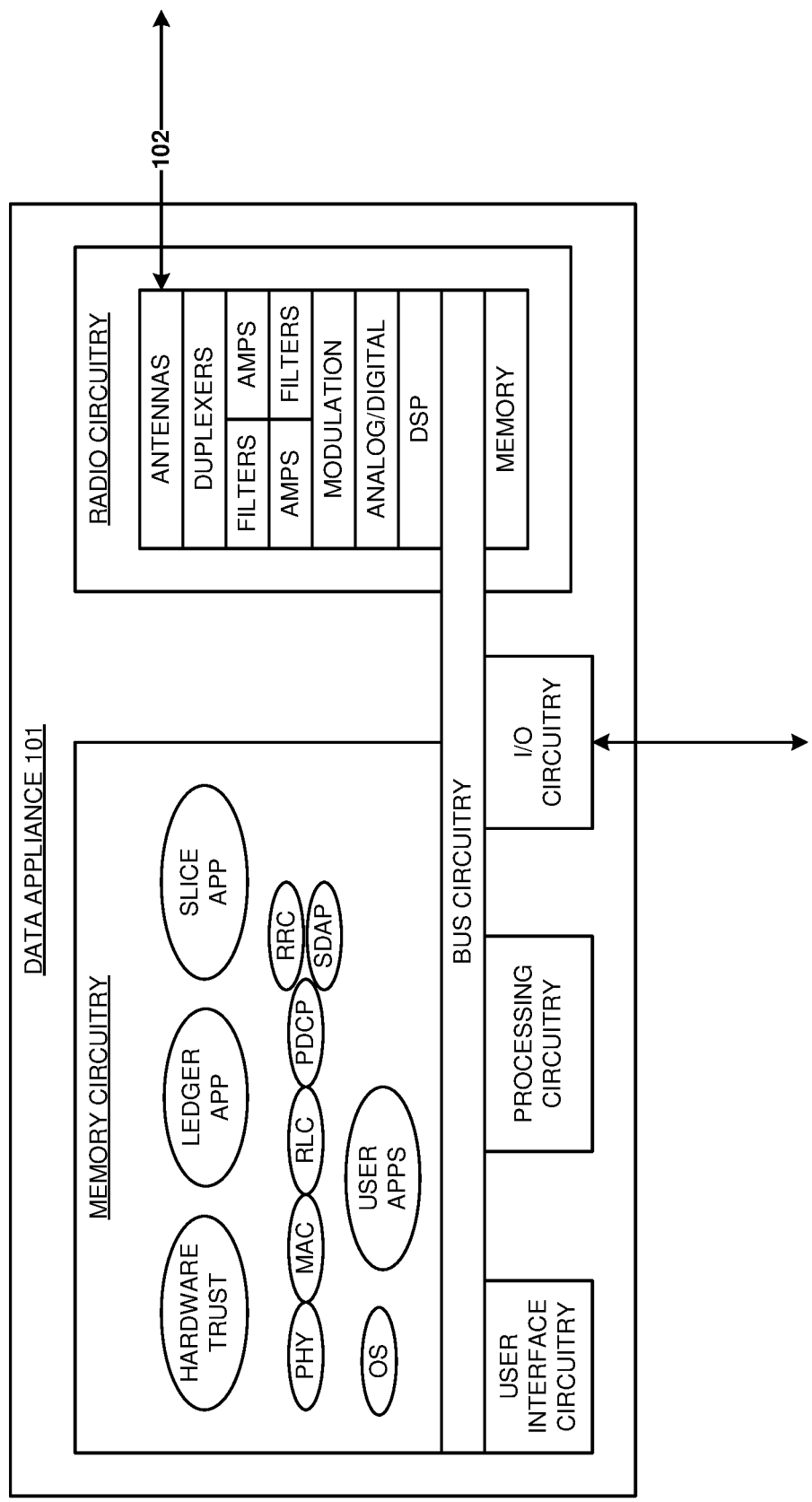
FIG. 7 illustrates a data appliance to access the wireless data network responsive to distributed ledger control.

FIG. 7 illustrates data appliance 101 that accesses wireless data network 100 responsive to distributed ledger control. This version of data appliance 101 is exemplary and other architectures could be used. Data appliance 101 comprises radio circuitry, memory circuitry, I/O circuitry, bus circuitry, processing circuitry, and user interface circuitry. The bus circuitry couples the radio circuitry, memory circuitry, I/O circuitry, processing circuitry and user interface circuitry. The radio circuitry comprises antennas, duplexers, filters, amplifiers, modulation, analog/digital interfaces, DSPs, memory, and typically other components. The memory circuitry stores user data, operating systems, user applications, and network applications like PHY, MAC, RLC, PDCP, RRC, SDAP, ledger interface, and slice control.

In the radio circuitry, the antennas wirelessly exchange data and signaling with wireless access point 110 over wireless link 102. The DSP executes firmware/software from the radio memory to drive the exchange of data between the radio memory and the antennas. In the processing circuitry, a CPU, GPU, ASIC, and/or some other circuitry executes the operating system and network applications to drive the exchange of data between the radio memory and the memory circuitry in data appliance 101. The processing circuitry executes the network applications to drive the exchange of data between the memory circuitry and the user interface circuitry, I/O circuitry, and/or radio memory. The user interface circuitry receives or presents the user data. The I/O circuitry exchanges user data with other data networks.

In the radio circuitry, the antennas receive wireless DL signals from wireless access point 110 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data and signaling from the DL signals and transfer the recovered DL data and signaling to the memory circuitry. The processing circuitry executes the OS and network applications to process the DL data and signaling and to transfer the DL data to memory circuitry for consumption by the user applications, user interface circuitry, I/O circuitry, and/or memory circuitry. The processing circuitry executes the OS and user applications to generate user data or receive user data from the I/O circuitry or user interface circuitry. The processing circuitry executes the OS and network applications to generate UL data and signaling. The DSP executes its software and firmware to transfer the UL data and signaling to antennas. The antennas wirelessly transmit the user data and signaling to wireless access point 110.

The processing circuitry executes the network slice application to interact with network slice controllers for device provisioning and service control. The processing circuitry executes the network slice application to receive instructions for the user interface, sensor data generation, hardware trust, network access, network data exchange, ledger data transfers, and the like. Consider an example where data appliance 101 is a flying drone that periodically delivers atmospheric information to distributed ledger 120. The user interface may present network information to the drone operator during configuration. The sensors may take various atmospheric readings and samples. The hardware trust application may read a read-only hardware identifier code embedded in data appliance 101 and transfer encrypted versions for hardware-trust validation. The hardware trust application may also receive and distribute hardware-trust digital certificates. The RRC transfers appliance identifiers and ledger indicators to obtain network access and the MAC exchanges user data per the network schedule. In these examples, distributed ledger 120 may effectively control drone activities and collect drone data.

Figure 8:
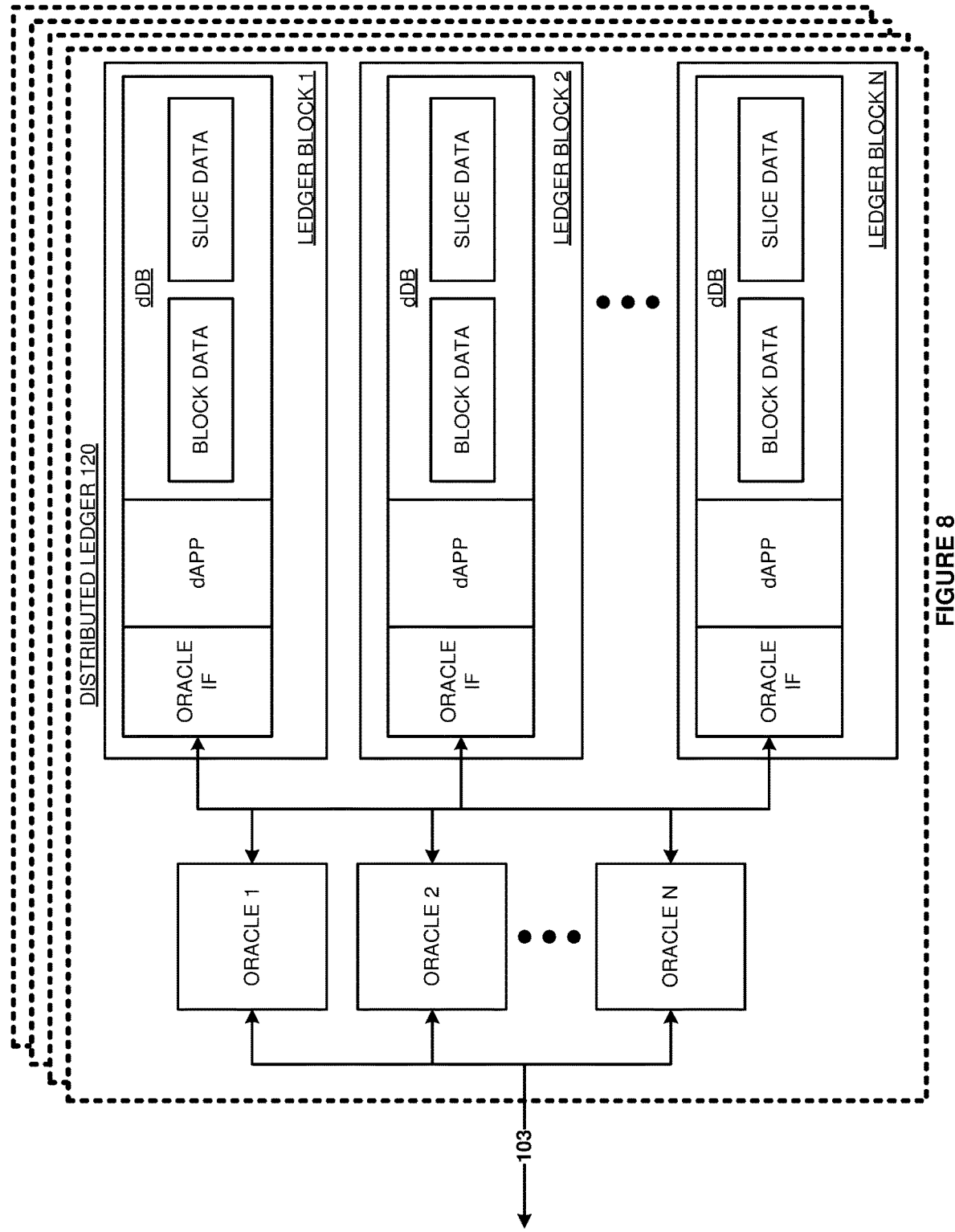
FIG. 8 illustrates the distributed ledger to control wireless network access for the data appliances.

FIG. 8 illustrates distributed ledger 120 to control wireless network access for data appliance 101. Distributed ledger 120 comprises multiple computers as indicated by the shapes going into the page. The computers may be resident in wireless access points, network cores, or other locations and are coupled over various data networks. Distributed ledger 120 comprises ledger oracles 1-N and ledger blocks 1-N. Ledger blocks 1-N are executed in all of the ledger computers and are coupled over the various data networks (which are not shown for clarity).

Ledger oracles 1-N are executed in a few ledger computers. Ledger oracles 1-N are coupled to wireless access node 110 over ledger link 103. Ledger blocks 1-N each comprise an oracle interface, distributed application, and distributed database. The oracle interface and distributed application are immutable for distributed ledger 120. The distributed application translates application identifiers into network access parameters for data appliances. The distributed application stores user data from the data appliances. The distributed database stores block data and slice data. The block data includes a hash of the previous block, a genesis block initiator ID, nonce, time stamps, roots, hashes, and the like. The slice data comprises user data from data appliance 101 and data outputs from the distributed application Ledger block 1 represents the genesis block for distributed ledger 120. Ledger block 1 may be derived from a genesis block template in the slice configuration or NSD for the network slice. The genesis block may be configured with software and data for appliance identifier validation including hardware trust operations. For example, the genesis block may have a hardware-trust key to decrypt hardware-trust digital certificates. The genesis block may have a data structure that translates appliance identifiers (and user data) into network access parameters like access times, data amounts, and service quality.

The oracle interfaces receive access requests and user data from oracles 1-N and transfer the access requests and user data to the distributed application. The distributed application reaches a consensus on new access requests, network access instructions, and user data with the other distributed applications that are executing in parallel across the computers that comprise distributed ledger 120.

In some examples, ledger oracles 1-N are configured with software and data for appliance identifier validation including hardware trust operations. For example, oracle 1 may comprise a hardware trust oracle that has a hardware-trust key and logic to decrypt and validate hardware-trust digital certificates. Ledger oracle 2 may have a data structure that translates appliance identifiers (and user data) into network access parameters. Other ledger oracles may be dedicated to tasks like new user device attachments, network signaling, user data, and the like.

The data network circuitry described above comprises computer hardware and software that form a special-purpose machine—wireless network circuitry with distributed ledgers to control wireless network access for data appliances. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry with distributed ledgers to control wireless network access for data appliances.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data network to wirelessly serve a data appliance, the method comprising:
   a wireless access point wirelessly receiving user data from the data appliance for a distributed ledger function and transferring the user data to the distributed ledger function;
   the distributed ledger function receiving and processing the user data, and in response, storing the user data in a distributed ledger database, determining additional network access for the data appliance, and transferring a network access instruction indicating the additional network access for the data appliance to the wireless access point;
   the wireless access point receiving the network access instruction, scheduling the additional network access for the data appliance per the network access instruction, wirelessly transferring a network access schedule to the data appliance, wirelessly receiving additional user data from the data appliance for the distributed ledger function per the network access schedule and transferring the additional user data to the distributed ledger function; and
   the distributed ledger function receiving and processing the additional user data, and in response, storing the additional user data in the distributed ledger database, determining future network access for the data appliance, and transferring another network access instruction indicating the future network access for the data appliance to the wireless access point.

2. The method of claim 1 further comprising:
   the wireless access point receiving the other network access instruction, scheduling the future network access for the data appliance per the other network access instruction, wirelessly transferring another network access schedule to the data appliance, wirelessly receiving subsequent user data from the data appliance for the distributed ledger function per the other network access schedule, and transferring the subsequent user data to the distributed ledger function; and
   the distributed ledger function receiving and processing the subsequent user data, and in response, storing the subsequent user data in the distributed ledger database.

3. The method of claim 1 wherein:
   the wireless access point transferring the user data comprises transferring the user data to the distributed ledger function in a wireless network core;
   the distributed ledger function receiving the user data and transferring the network access instruction comprises receiving the user data in the wireless network core and transferring the network access instruction from the wireless network core;
   the wireless access point receiving the network access instruction and transferring the additional user data comprises receiving the network access instruction from the distributed ledger in the wireless network core and transferring the additional user data to the distributed ledger in the wireless network core; and
   the distributed ledger function receiving the additional user data and transferring the other network access instruction comprises receiving the additional user data in the wireless network core and transferring the other network access instruction from the wireless network core.

4. The method of claim 1 wherein:

the wireless access point transferring the user data comprises transferring the user data to a user plane function in a wireless network core;

the distributed ledger function receiving the user data and transferring the network access instruction comprises receiving the user data from the user plane function in the wireless network core and transferring the network access instruction to the user plane function in the wireless network core;

the wireless access point receiving the network access instruction and transferring the additional user data comprises receiving the network access instruction from the user plane function in the wireless network core and transferring the additional user data to the user plane function in the wireless network core; and the distributed ledger function receiving the additional user data and transferring the other network access instruction comprises receiving the additional user data from the user plane function in the wireless network core and transferring the other network access instruction to the user plane function in the wireless network core; and further comprising:

the user plane function in the wireless network core receiving the user data from the wireless access point, transferring the user data to the distributed ledger function, receiving the network access instruction from the distributed ledger function, transferring the network access instruction to the wireless access point, receiving the additional user data from the wireless access point, and transferring the additional user data to the distributed ledger function.

5. The method of claim 1 wherein:

the wireless access point transferring the user data comprises transferring the user data to a user plane function in a wireless network core;

the distributed ledger function receiving the user data and transferring the network access instruction comprises receiving the user data in the wireless network core from the user plane function in the wireless network core and transferring the network access instruction in the wireless network core to the user plane function in the wireless network core;

the wireless access point receiving the network access instruction and transferring the additional user data comprises receiving the network access instruction from the user plane function in the wireless network core and transferring the additional user data to the user plane function in the wireless network core;

the distributed ledger function receiving the additional user data and transferring the other network access instruction comprises receiving the additional user data in the wireless network core from the user plane function in the wireless network core and transferring the other network access instruction in the wireless network core to the user plane function in the wireless network core; and further comprising:

the user plane function in the wireless network core receiving the user data from the wireless access point, transferring the user data to the distributed ledger function in the wireless network core, receiving the network access instruction from the distributed ledger function in the wireless network core, transferring the network access instruction from the wireless network core to the wireless access point, receiving the additional user data in the wireless network core from the wireless access point, and transferring the additional user data to the distributed ledger function in the wireless network core.

6. The method of claim 1 wherein:

the wireless access point transferring the user data comprises transferring the user data to a user plane function in a wireless network core;

the distributed ledger function receiving the user data and transferring the network access instruction comprises receiving the user data in the wireless network core from the user plane function in the wireless network core over a virtual switch and transferring the network access instruction in the wireless network core to the user plane function in the wireless network core over the virtual switch;

the wireless access point receiving the network access instruction and transferring the additional user data comprises receiving the network access instruction from the user plane function in the wireless network core and transferring the additional user data to the user plane function in the wireless network core;

the distributed ledger function receiving the additional user data and transferring the other network access instruction comprises receiving the additional user data in a wireless network core from the user plane function in the wireless network core over the virtual switch and transferring the other network access instruction in the wireless network core to the user plane function in the wireless network core over a virtual switch; and further comprising:

the user plane function in the wireless network core receiving the user data from the wireless access point, transferring the user data to the virtual switch in the wireless network core, receiving the network access instruction from the virtual switch in the wireless network core, transferring the network access instruction from the wireless network core to the wireless access point, receiving the additional user data in the wireless network core from the wireless access point, and transferring the additional user data to the virtual switch in the wireless network core; and the virtual switch in the wireless network core receiving the user data from the user plane function in the wireless network core, transferring the user data to the distributed ledger function in the wireless network core, receiving the network access instruction from the distributed ledger function in the wireless network core, receiving the additional data from the user plane function in the wireless network core, and transferring the additional user data to the distributed ledger function in the wireless network core.

7. The method of claim 1 further comprising:

the wireless access point transferring a data appliance Identifier (ID) to an access and mobility management function in a wireless network core;

the access and mobility management function in the wireless network core receiving the data appliance identity from the wireless access point and transferring the data appliance identity to the distributed ledger function in the wireless network core; and the distributed ledger function in the wireless network core receiving the data appliance identity from the access and mobility management function in the wireless network core.

8. The method of claim 1 further comprising:
a radio resource control in the wireless access point receiving a data appliance identity from the data appliance and transferring the data appliance identity to an access and mobility management function in a wireless network core;
the access and mobility management function in the wireless network core receiving the data appliance identity from the radio resource control in the wireless access point and transferring the data appliance identity to the distributed ledger function in the wireless network core; and
the distributed ledger function in the wireless network core receiving the data appliance identity from the access and mobility management function in the wireless network core.

9. The method of claim 1 wherein the distributed ledger function processing the user data, storing the user data in the distributed ledger database, and determining the additional network access for the data appliance, processing the additional user data, storing the additional user data in the distributed ledger database, and determining the future network access for the data appliance comprises a distributed ledger node in a distributed ledger executing a distributed application for the distributed ledger.

10. The method of claim 1 wherein the distributed ledger function comprises at least a portion of a wireless network slice in the wireless data network.

11. A wireless data network to wirelessly serve a data appliance, the wireless data network comprising:
a wireless access point configured to wirelessly receive user data from the data appliance for a distributed ledger function and transfer the user data to the distributed ledger function;
the distributed ledger function configured to receive and process the user data, and in response, store the user data in a distributed ledger database, determine additional network access for the data appliance, and transfer a network access instruction indicating the additional network access for the data appliance to the wireless access point;
the wireless access point configured to receive the network access instruction, schedule the additional network access for the data appliance per the network access instruction, wirelessly transfer a network access schedule to the data appliance, wirelessly receive additional user data from the data appliance for the distributed ledger function per the network access schedule and transfer the additional user data to the distributed ledger function; and
the distributed ledger function configured to receive and process the additional user data, and in response, store the additional user data in the distributed ledger database, determine future network access for the data appliance, and transfer another network access instruction indicating the future network access for the data appliance to the wireless access point.

12. The wireless data network of claim 11 further comprising:
the wireless access point configured to receive the other network access instruction, schedule the future network access for the data appliance per the other network access instruction, wirelessly transfer another network access schedule to the data appliance, wirelessly receive subsequent user data from the data appliance for the distributed ledger function per the other network access schedule, and transfer the subsequent user data to the distributed ledger function; and
the distributed ledger function configured to receive and process the subsequent user data, and in response, store the subsequent user data in the distributed ledger database.

13. The wireless data network of claim 11 wherein:
the wireless access point is configured to transfer the user data to the distributed ledger function in a wireless network core;
the distributed ledger function is configured to receive the user data in the wireless network core and transfer the network access instruction from the wireless network core;
the wireless access point is configured to receive the network access instruction from the distributed ledger in the wireless network core and transfer the additional user data to the distributed ledger in the wireless network core; and
the distributed ledger function is configured to receive the additional user data in the wireless network core and transfer the other network access instruction from the wireless network core.

14. The wireless data network of claim 11 wherein:
the wireless access point is configured to transfer the user data to a user plane function in a wireless network core;
the distributed ledger function is configured to receive the user data from the user plane function in the wireless network core and transfer the network access instruction to the user plane function in the wireless network core;
the wireless access point is configured to receive the network access instruction from the user plane function in the wireless network core and transfer the additional user data to the user plane function in the wireless network core; and
the distributed ledger function is configured to receive the additional user data from the user plane function in the wireless network core and transfer the other network access instruction to the user plane function in the wireless network core; and further comprising:
the user plane function in the wireless network core configured to receive the user data from the wireless access point, transfer the user data to the distributed ledger function, receive the network access instruction from the distributed ledger function, transfer the network access instruction to the wireless access point, receive the additional user data from the wireless access point, and transfer the additional user data to the distributed ledger function.

15. The wireless data network of claim 11 wherein:
the wireless access point is configured to transfer the user data to a user plane function in a wireless network core;
the distributed ledger function is configured to receive the user data in the wireless network core from the user plane function in the wireless network core and transfer the network access instruction in the wireless network core to the user plane function in the wireless network core;
the wireless access point is configured to receive the network access instruction from the user plane function in the wireless network core and transfer the additional user data to the user plane function in the wireless network core;
the distributed ledger function is configured to receive the additional user data in the wireless network core from the user plane function in the wireless network core and transfer the other network access instruction in the wireless network core to the user plane function in the wireless network core; and further comprising:

the user plane function in the wireless network core configured to receive the user data from the wireless access point, transfer the user data to the distributed ledger function in the wireless network core, receiving the network access instruction from the distributed ledger function in the wireless network core, transfer the network access instruction from the wireless network core to the wireless access point, receive the additional user data in the wireless network core from the wireless access point, and transfer the additional user data to the distributed ledger function in the wireless network core.

16. The wireless data network of claim 11 wherein:

the wireless access point is configured to transfer the user data to a user plane function in a wireless network core;

the distributed ledger function is configured to receive the user data in the wireless network core from the user plane function in the wireless network core over a virtual switch and transfer the network access instruction in the wireless network core to the user plane function in the wireless network core over the virtual switch;

the wireless access point is configured to receive the network access instruction from the user plane function in the wireless network core and transfer the additional user data to the user plane function in the wireless network core;

the distributed ledger function is configured to receive the additional user data in a wireless network core from the user plane function in the wireless network core over the virtual switch and transfer the other network access instruction in the wireless network core to the user plane function in the wireless network core over a virtual switch; and further comprising:

the user plane function in the wireless network core configured to receive the user data from the wireless access point, transfer the user data to the virtual switch in the wireless network core, receive the network access instruction from the virtual switch in the wireless network core, transfer the network access instruction from the wireless network core to the wireless access point, receive the additional user data in the wireless network core from the wireless access point, and transfer the additional user data to the virtual switch in the wireless network core; and the virtual switch in the wireless network core is configured to receive the user data from the user plane function in the wireless network core, transfer the user data to the distributed ledger function in the wireless network core, receive the network access instruction from the distributed ledger function in the wireless network core, receive the additional data from the user plane function in the wireless network core, and transfer the additional user data to the distributed ledger function in the wireless network core.

17. The wireless data network of claim 11 further comprising:

the wireless access point configured to transfer a data appliance Identifier (ID) to an access and mobility management function in a wireless network core;

the access and mobility management function in the wireless network core configured to receive the data appliance identity from the wireless access point and transfer the data appliance identity to the distributed ledger function in the wireless network core; and the distributed ledger function in the wireless network core configured to receive the data appliance identity from the access and mobility management function in the wireless network core.

18. The wireless data network of claim 11 further comprising:

a radio resource control in the wireless access point configured to receive a data appliance identity from the data appliance and transfer the data appliance identity to an access and mobility management function in a wireless network core;

the access and mobility management function in the wireless network core configured to receive the data appliance identity from the radio resource control in the wireless access point and transfer the data appliance identity to the distributed ledger function in the wireless network core; and the distributed ledger function in the wireless network core configured to receive the data appliance identity from the access and mobility management function in the wireless network core.

19. The wireless data network of claim 11 wherein the distributed ledger function is configured to process the user data, store the user data in the distributed ledger database, and determine the additional network access for the data appliance, process the additional user data, store the additional user data in the distributed ledger database, and determine the future network access for the data appliance by executing a distributed application for a distributed ledger.

20. The wireless data network of claim 11 wherein the distributed ledger function comprises at least a portion of a wireless network slice in the wireless data network.

* * * * *